United States Patent
Pickett et al.

(10) Patent No.: US 6,403,686 B1
(45) Date of Patent: Jun. 11, 2002

(54) RHEOLOGICALLY-DYNAMIC, LIQUID-APPLICABLE ELASTOMERIC COMPOSITIONS

(75) Inventors: Matthew T. Pickett, Cambridge; Jay S. Kellett, Reading; Jianye Wen, Waltham; David S. Hart, Brighton, all of MA (US)

(73) Assignee: W.R. Grace & Co. - Conn., New York, NY (US)

( * ) Notice: Subject to any disclaimer, the term of this patent is extended or adjusted under 35 U.S.C. 154(b) by 0 days.

(21) Appl. No.: 09/547,823

(22) Filed: Apr. 11, 2000

(51) Int. Cl.$^7$ .............................. C08L 91/00; C08F 8/00; C08C 19/00

(52) U.S. Cl. .................. 524/310; 524/446; 524/475; 524/514; 524/575.5; 525/332.5; 525/332.6

(58) Field of Search ................... 524/310, 446, 524/475, 514, 575.5; 525/332.5, 332.6

(56) References Cited

U.S. PATENT DOCUMENTS

| | | | |
|---|---|---|---|
| 4,128,436 A | 12/1978 | O'Hara et al. | 106/243 |
| 4,248,926 A | 2/1981 | Tajima et al. | 428/253 |
| 4,249,950 A | 2/1981 | Hurst | 106/90 |
| 4,287,242 A | 9/1981 | Monden et al. | 427/426 |
| 4,362,841 A | 12/1982 | Minatono et al. | 524/531 |
| 4,554,313 A | 11/1985 | Hagenbach et al. | 525/54.5 |
| 4,567,222 A | 1/1986 | Hagenbach et al. | 524/476 |
| 4,609,696 A | 9/1986 | Wilkes | 524/59 |
| 4,657,595 A | 4/1987 | Russell | 106/277 |
| 4,745,155 A | 5/1988 | Grossi | 525/54.5 |
| 4,787,780 A | 11/1988 | Harriett | 405/270 |
| 4,872,932 A | 10/1989 | Yoshikawa et al. | 156/151 |
| 4,992,334 A | 2/1991 | Kindt et al. | 428/489 |
| 5,078,905 A | 1/1992 | Trinh et al. | 252/182.17 |
| 5,091,447 A | 2/1992 | Lomasney | 523/408 |
| 5,104,916 A | 4/1992 | Trinh et al. | 524/71 |
| 5,130,182 A | 7/1992 | Aoshima et al. | 428/212 |
| 5,159,980 A | 11/1992 | Onan et al. | 166/294 |
| 5,340,390 A | 8/1994 | Magauran et al. | 106/244 |
| 5,382,612 A | 1/1995 | Chaverot et al. | 524/60 |
| 5,565,511 A | 10/1996 | Braud et al. | 524/270 |
| 5,578,800 A | 11/1996 | Kijima | 181/171 |
| 5,763,014 A | 6/1998 | Pickett | 427/430 |

FOREIGN PATENT DOCUMENTS

| | | |
|---|---|---|
| EP | 0645432 A1 | 3/1995 |
| GB | 2023124 A | 12/1979 |
| GB | 2205104 A | 11/1988 |
| JP | Sho 57-5774 | 1/1982 |

OTHER PUBLICATIONS

Hawley's Condensed Chemical Dictionary, Eleventh Edition, 1987, pp. 806–807.*
"SERVIDEK™/SERVIPAK™ Bridge Deck Waterproofing" publication date, Dec. 1992.
Journal of the American Oil Chemists' Society, "Symposium: Novel Uses of Agricultural Oils", F.C. Naughton, vol. 51, Mar. 1974, pp. 65–71.
Journal of the American Oil Chemists' Society, "Chemical Derivatives of Caster Oil", K.T. Achaya, vol. 48, Nov. 1971, pp. 758–763.
Elementis Specialties, "Thixatrol® Plus", Aug. 1997, DS–893.
Elementis Specialties, Thixcin® R, Thixcin GR, Aug. 1997, DS–402.
Process Oil Properties, Lubricants, Soc: 1086–97d, 6 pgs.

* cited by examiner

*Primary Examiner*—Peter D. Mulcahy
(74) *Attorney, Agent, or Firm*—Craig K. Leon; William L. Baker

(57) ABSTRACT

Improved compositions of the present invention are made from a rubber latex component (A) and an oil carrier component (B) having hygroscopic and vulcanizing agents. Upon intermixing of the components A and B, an elastomeric composition is formed that can undergo a rheological transformation from a flowable liquid to a solidified elastomeric solid. An improved linear slope between fluidity and temperature is achieved by using naphthenic oil in the oil carrier component (B) with an organic rheology modifier, such as a modified castor oil and/or a polyamide. Further exemplary compositions comprise an inorganic rheology modifier such as an activated clay.

21 Claims, 3 Drawing Sheets

RHEOLOGICALLY-DYNAMIC, LIQUID-APPLICABLE ELASTOMERIC COMPOSITIONS

FIELD OF THE INVENTION

This invention pertains to improved rheologically-dynamic elastomeric compositions, and more particularly to a composition made using a naphthenic oil carrier and one or more rheology modifiers for improved rheological behavior as a function of temperature.

BACKGROUND OF THE INVENTION

A rheologically-dynamic fluid applied elastomeric composition having usefulness for waterproofing and other applications was taught in U.S. Pat. No. 5,763,014 of Pickett, which is incorporated herein by reference. The composition of Picket may be characterized as being "rheologically-dynamic" because the intermixing of two components A and B initiated a number of rheological transformations. Component A comprised an aqueous rubber latex (e.g., styrene butadiene latex, natural rubber, styrene butadiene styrene, butyl rubber, neoprene, nitrite rubber, acrylate, and the like may be used, along with known emulsifying or latex stabilizing agents). Component B, on the other hand, comprised an oil carrier in which were dispersed both a hygroscopic agent and vulcanizing agent. Upon intermixing, component A and B formed a water-in-oil blend wherein the hygroscopic and vulcanizing agents were located in the continuous oil carrier phase, and the rubber was dispersed as droplets in a discontinuous water phase. The respective locations of these components set up a dynamic reaction system: the rubber contained in the aqueous environment of the latex became swelled by the oil carrier, while the hygroscopic agent contained in the oil carrier became chemically bound with the water in the discontinuous aqueous phase. Both factors contributed to the gradual stiffening (e.g., increased viscosity) of the component mixture, and facilitated the initiation of a third process: the vulcanizing agent or agents contained in the continuous oil carrier phase became introduced to the rubber in the discontinuous aqueous phase of the latex, resulting in the hardening of the composition into a solid elastomeric mass. The composition thus provided, at the outset, a flowable or sprayable liquid which could be applied in substantial thicknesses, and which was transformed into a hardened thickness of mass without requiring repeated coatings or applications.

The present inventors sought to improve upon the rheologically-dynamic elastomeric composition taught by the '014 patent. As a starting point, they focused their attention upon the flowability characteristic of the composition as a function of temperature, and how this relationship might be modified in view of the rheological phenomena and dynamic component inter-relationships discussed above. It was during applications of the composition as a waterproofing coating on outdoor building surfaces that they began to realize that the flowability characteristics of the composition were affected in an unusual way, and this was particularly evident at low temperatures. When data was gathered, and the viscosity of the composition was measured as a function of temperature, it was found that viscosity was not consistent over the temperature range of 40–100° F. As shown in FIG. 1, the composition (of the '014 patent) exhibited a highly desirable viscosity characteristic within the range of about 70–93° F. Above and below this temperature range, however, the changes of viscosity over temperature were less predictable. In particular, the composition became increasingly difficult to apply as a coating due to its rapidly accelerating stiffness. Thus, the present inventors realized that an improved elastomeric composition would be desirable because it would allow greater application and usage possibilities over a greater temperature range.

The task of reformulating elastomeric compositions, such as changing rheology modifiers, is hardly a routine matter, particular for dynamic two-phase systems as in the present case. For example, an incorrect substitution of one or more rheology modifiers might cause the rubber particles to remain phase-separated from the oil carrier. This might result, on the one hand, in a two-phase product. Incorrect substitutions might also cause, on the other hand, rubber particles to be transferred too quickly into the oil phase, resulting in an overly-rapid acceleration of viscosity.

SUMMARY OF THE INVENTION

As an improvement of two-component, rheologically-dynamic elastomeric formulations of the kind disclosed in U.S. Pat. No. 5,763,014 of Pickett, the present invention achieves a substantially extended linear viscosity behavior as a function of temperature. The new formulations of the present invention not only provide better control over composition viscosity, but also the transfer rate of rubber particles from the aqueous droplets (of the discontinuous latex phase) into the oil carrier (continuous phase). This improved control over rheology dynamics is accomplished by substituting the aromatic/paraffinic oil taught by Pickett '014 with a naphthenic oil (e.g., containing predominantly naphthene oil in an amount of at least 40 wt. % based on total weight of oil carrier). To enable high levels of naphthene oil to be employed, the present inventors employed an organic rheology modifier in the oil carrier phase (e.g., component B) that provided a thixotropic structure whereby solids could be suspended in the oil phase.

Exemplary organic rheology modifiers suitable for use in the invention include a modified castor oil, a polyamide, a branched or straight chain alkylene group having a molecular weight of 1000–100,000, calcium sulfonate, a modified urea, or a mixture thereof. Modified castor oil is most preferred.

Other exemplary compositions further comprise an inorganic rheology modifier, such as an activated clay. Activated clays may be obtained by treating smectite clay (e.g., bentonite, hectorite, etc.) with a clay-activity modifying agent such as a quaternary amine.

One surprising improvement obtained by the novel combination is that, when viscosity (V) is measured as a function of temperature (T), an extended and substantially linear slope defined by (dV/dT) can be attained. The viscosity behavior of the system demonstrates a linear behavior over a greater temperature range (e.g., dV/dT more consistent over range of 40–100° F.) than previously achieved by two-component, dynamically rheological elastomer systems.

An exemplary elastomeric formulation of the invention thus comprises: components A and B which are combinable to form a blend in which a vulcanizing reaction is initiated for solidifying the components into a solid mass; component A thereof comprising an aqueous latex of natural or synthetic rubber; and component B thereof comprising an oil carrier in which is dispersed a vulcanizing agent operative to cure the component A rubber, and component B further comprising a hygroscopic agent operative to chemically bind the water in component A; the component A and B being operative when intermixed to form a water-in-oil blend whereby the oil carrier containing the hygroscopic agent and vulcanizing agent provides a continuous phase wherein an aqueous phase of component A containing the rubber is dispersed therein as a discontinuous phase, the respective locations of the hygroscopic agent, vulcanizing agent, and rubber thereby providing a reaction dynamic wherein the rubber becomes swelled by the oil and the hygroscopic agent chemically binds water in the latex discontinuous aqueous phase, thereby effectuating an increase in viscosity of the intermixed components and enabling the vulcanizing agent and rubber to be introduced to each other such that curing can be achieved at a time later than said viscosity-increasing effectuation; the oil carrier of component B comprising: (a) a napthenic oil in the amount of 40–90% by total weight of the oil carrier; and (b) an organic rheology modifier, preferably a modified castor oil, in the amount of 0.4%–3.5% by total weight of the oil carrier.

In other exemplary formulations of the invention, an inorganic rheology modifier, such as a modified clay, is employed to further improve the rheological behavior of the formulation as a function of temperature.

In addition to the novel formulation compositions described above, the present invention also provides methods for making elastomeric compositions.

BRIEF DESCRIPTION OF THE DRAWINGS

An appreciation of the following detailed description may be facilitated by reference to the accompanying figures, wherein FIG. 1 provides a comparative graphic illustration of the viscosity behavior of a prior art rheologically-dynamic composition (U.S. Pat. No. 5,763,014) and the viscosity behavior of a composition of the present invention, measured as a function of temperature.

DETAILED DESCRIPTION OF PREFERRED EMBODIMENTS

Figure 1:
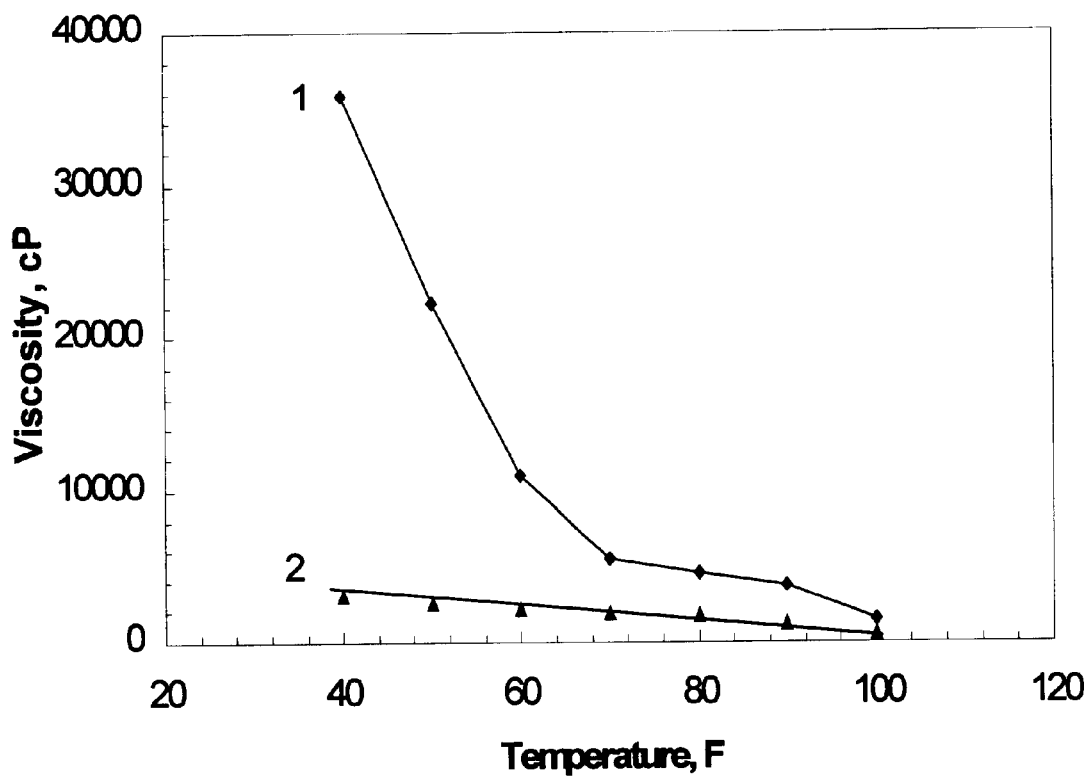

FIG. 1 illustrates the viscosity behavior of two rheologically-dynamic elastomeric compositions. Viscosity was measured as a function of temperature using an AR-1000 Rheometer, available from TA Instruments, set at a sheer rate of 1.5/S. The first formulation (designated "1") was a prior art composition as taught in U.S. Pat. No. 5,763,014 of Pickett. The second formulation (designated "2") was an examplary formulation made in accordance with the present invention, as further discussed herein and after. These formulations are the type involving two components (designated A and B) which can be provided separated from each other (in separate containers, compartments, etc.), and combined (such as at a job site) to initiate a dynamic rheology change and, ultimately, hardening of the composition.

When Viscosity (change expressed as dV) is measured against Temperature (change expressed as dT) for both formulations, it can easily be seen that, with regard to the novel exemplary formulation of the present invention, the linearity of the slope (dV/dT) was extended remarkably well below 70° F. as well as above 90° F.

The improved compositions of the present invention are better appreciated in terms of their fundamental differences from the formulation disclosed in U.S. Pat. No. 5,763,014 of Pickett. Component A of the present invention may comprise known rubber latexes along with optional surfactants and latex stabilizers (see e.g., Pickett '014, Col. 4, ll. 47–62). In the '014 patent, Component B comprised an aromatic process oil and paraffinic oil as the oil fluid carrier (See e.g., Col. 6, ll. 44–45; Col. 7, ll. 4–5; Col. 7, ll. 18–19; Col. 8, ll. 37–39). However, the present inventors realized that aromatic oils have a predominant number of aromatics with typical properties of high solvency and viscosity. These types of oils are characterized by a tendency to increase dramatically in viscosity at low ambient temperature and become waxy or semi-solid. They also realized that paraffinic oils have paraffins (general formula $C_nH_{2n+2}$) as the major component with typical properties including low solvency and excellent stability. The workable temperature range of the composition, particularly when applied to a substrate surface as a coating system, is strongly dependent on the viscosity of the oil carrier component. Because the viscosity of the blend of aromatic and paraffinic oil can change significantly with temperature changes, the coating system has a relatively narrow workable temperature range. Where the composition is troweled or otherwise manually applied onto a substrate as a coating, the composition may be characterized by a tendency to become heavy and difficult to spread at temperatures below 50° F. or to become too fluid for making a consistent film above 80° F. If sprayed, the composition might be too thick to pump at the lower temperatures, and would require an external heat source.

Thus, improved temperature behavior is provided by using naphthenic oil in the oil carrier (component B). The present inventors discovered, however, that naphthenic oil preferably required use of an organic rheology modifier as a thickener for component B and as a way to control the transfer of rubber to the naphthenic oil carrier. The use of naphthenic oil in combination with the right modifier resulted in surprising and significant improvements in terms of achieving an extended workable temperature range by which the composition could be applied as a coating.

For a more detailed understanding of the present invention, a set of definitions will be helpful. The terms "paraffin" as used herein means and refer to hydrocarbons having straight or branched chains, but without any ring structure:

| | |
|---|---|
| $CH_3(CH_2)_nCH_3$ | Straight-chain paraffin |
| $CH_3CH_2CH_2(CH_2)_mCH_2CH(CH_3)_2$ | Branched-chain paraffin |

The term "naphthene" as used herein means and refers to saturated hydrocarbons containing one or more rings, each of which may have one or more paraffinic side chains:

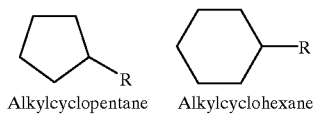

Alkylcyclopentane  Alkylcyclohexane wherein the letter R represents an alkyl group of the formula $C_nH_{2n+1}$, The term "aromatic" as used herein means and refers to hydrocarbons containing one or more aromatic nuclei, such as benzene, naphthalene, and phenanthrene ring systems, which may be linked up with (substituted) naphthene rings and/or paraffinic side chains:

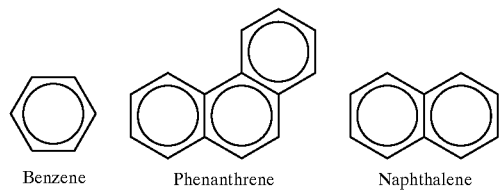

Benzene  Phenanthrene  Naphthalene

Aromatics, paraffins, and naphthenes are the major components, respectively, of aromatic oils, paraffinic oils, and naphthenic oil. "Aromatic oils" are so called because they contain a predominant number of aromatics. "Paraffinic oils" are so called because they contain paraffins (having general formula $C_nH_{2n+2}$) as the major component. "Naphthenic oils" have naphthenes (saturated cyclic hydrocarbons ($C_6$ ring) with general formula $C_nH_{2n}$) as the major component.

Table 1 shows the typical ranges for the various oils.

TABLE 1

| Oil type | % Paraffins | % Aromatics | % Naphthenes |
|---|---|---|---|
| Paraffinic | 46–61 | 12–25 | 22–32 |
| Aromatic | 0–8 | 57–78 | 20–25 |
| Naphthenic | 15–26 | 8–13 | 61–76 |

The present inventors have selected "naphthenic" oils as the primary oil constituent of the oil carrier (component B) because for purposes of the present invention they provide higher solvency (than paraffinic oils), better high temperature properties (than aromatic oils), and excellent low temperature handling properties.

Thus, while it may be said that in specifying "aromatic" and "paraffinic" oils, Pickett (in U.S. Pat. No. 5,763,014) impliedly taught naphthenes in the oil carrier component B, it was not known until the present invention that dynamics of the two-component formulation could be so drastically altered by using a "naphthenic" oil. In other words, the use of "naphthene oil" is different from using "naphthenic oil" because these are two different concepts having a drastically difference result. The result is shown in FIG. 1 wherein the viscosity behavior of the elastomeric formulation is illustrated as a function of temperature. Elastomeric compositions containing naphthenic oil (see Plot/curve labelled "2") demonstrated a linear relationship between viscosity and temperature regardless of the initial viscosity of the system and a linear relationship (dV/dT) that could be consistently maintained over a much greater temperature range than was the case for the formulation of U.S. Pat. No. 5,763,014 (curve "1"). These results are indeed dramatically different.

Equation (1) below provides the viscosity-temperature correlation for curve 2 in FIG. 1.

$$V = 4487 - 38\,T \tag{1}$$

where
   V is viscosity in cP (centipoise), and
   T is temperature in F (degrees Fahrenheit)
However, for elastomeric systems containing aromatic and paraffinic oils, viscosity changed dramatically with temperature, as shown in curve 1 of FIG. 1. Viscosity and temperature have a non-linear relationship, as shown in equation (2), as follows:

$$V = 189280 - 6172T - 69T^2 \tag{2}$$

where
   V is viscosity in cP (centipoise), and
   T is temperature in F (degrees Fahrenheit)
The linear behavior of the formulation makes it easier to predict the performance of the formulation in various temperature applications (e.g., where application site is subject to external temperature variations, heat build-up, cooling or freezing temperatures, etc.).

Exemplary organic rheology modifiers for use within the naphthenic oil carrier of the present invention include modified castor oil, a polyamide, a linear or branched alkylene having a molecular weight of 1000–100,000, calcium sulfonate, modified urea, or mixture thereof. Modified castor oil and/or a polyamide are preferred.

Figure 2:
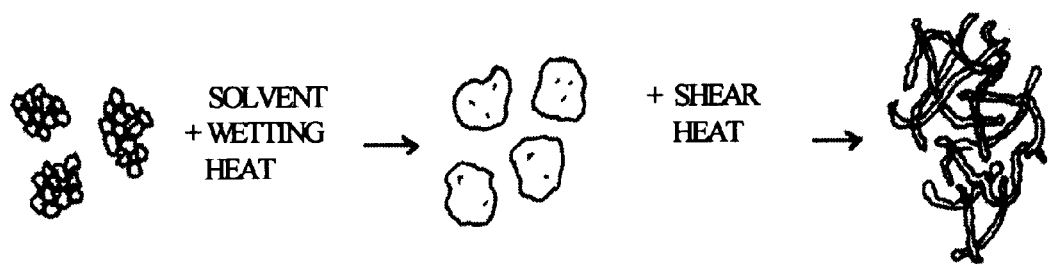
FIG. 2 is a graphic illustration of the use of a modified castor oil which is subjected to shearing forces and employed as an organic rheology modifier for use in the present invention.

FIG. 2 provides a graphic illustration of the thickening mechanism of a modified castor oil-based (organic rheology) modifier in the present invention. Preferred modifications to castor oil include hydrogenation, esterification, epoxidation, sulfonation, polymerization, or mixture thereof. Modified castor oil, which is usually provided as dry powder, may be incorporated into formulations of the invention by placing it in naphthenic oil, which is heated and sheared to disperse the particles. When sheared and activated, the particles provide a three-dimensional network (depicted like "noodles" in FIG. 2) having a thixotropic effect. Accordingly, formulation of the present invention comprise an inorganic rheology modifier having a "stacked card house" structure within a naphthenic oil-based oil carrier with an organic rheology modifier such as modified castor oil (and/or a polyamide).

Castor oil has three portions in its molecule and can be modified by subjecting internal ester linkages, double bonds, and hydroxyl groups to the following chemical modifications to provide the various modified castor oils (as shown on the following page).

TABLE 2

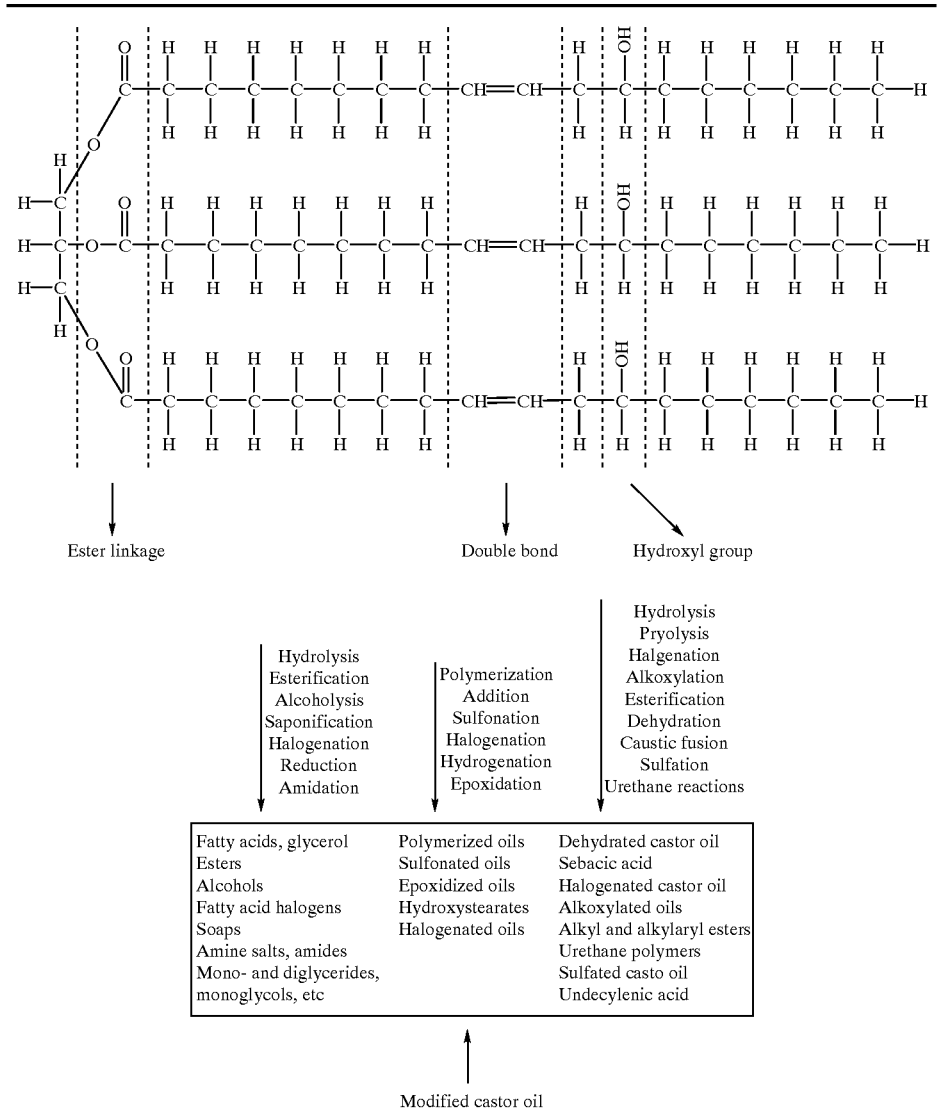

Castor oil is derived from beans of the castor plant *Ricinus commmunis* (family Euphorbiaceae), and also called ricinus oil, oil of Palma Christi, tangantangan oil, and neoloid. Castor oil is a triglyceride of various fatty acids, and has a high (87–90 wt %) content of ricinoleic acid ($C_{18}H_{34}O_3$, structurally cis-12-hydroxyoctadeca-9-enoic acid) having the structural formula $$CH_3(CH_2)_5CH(OH)CH_2CH=CH(CH_2)_7COOH$$

which is an eighteen-carbon hydroxylated fatty acid having one double bond.

Preferred modified castor oils are modified by hydrogenation, epoxidation, esterification, sulfonation, polymerization, or combinations thereof. Most preferred is hydrogenated castor oil, whose principal constituent is the glyceride of 12-hydroxystearic acid, sometimes called "castorwax". Minor quantities of mixed glycerides of acid and dihydroxystearic and stearic acids are believed present (due to hydrogenation).

Another preferred organic rheology modifier is a polyamide derived from hydroxystearic acid, alpha-omega diamines containing 2–10 carbon atoms, and dicarboxylic acids.

Most preferred organic rheology modifiers are modified castor oils having a polyamide blended in a ratio of 1:9 to 9:1.

Sulfonation of castor oil is another preferred modification. This is also known as "turkey-red" oil, and is prepared by sulfonating castor oil with sulfuric acid, resulting largely in a sulfuric acid ester in which the hydroxyl group of ricinoleic acid is esterified.

Modified castor oils believed suitable for the present invention are available from Rheox, Inc. of Hightstown, N.J., as THIXCIN® (R and GR) and THIXATROL® (1, ST, GST, SR-100, and PLUS); and also from Troy Chemical Corp. of Newark, N.J., as TROYTHIX® (XYZ, A, 42HA, Anti-sag4).

In further exemplary embodiments of the invention, an inorganic rheology modifier, such as modified clay, may optionally be employed in combination with the organic rheology modifier (castor oil) described above, to foster compatability between the rubber latex and oil carrier components. The modified clay is preferably a reaction product of a smectite clay (e.g., bentonite, hectorite) and a clay-modifying agent. A preferred clay modifying agent is a quaternary amine. Further modification of clays can be done by incorporation of polar activators such as propylene carbonate, methanol, or water. Clays modified with an activity modifying agent help to provide viscosity build-up, sag control, and pigment suspension properties in compositions of the invention, and are particularly useful where the compositions are used as coatings. Such treated clays are typically available in powder form. To thicken a composition, the clay powder must be incorporated in a way that ensures that ill dispersion, activation, and gelation of the clay take place.

Figure 3:
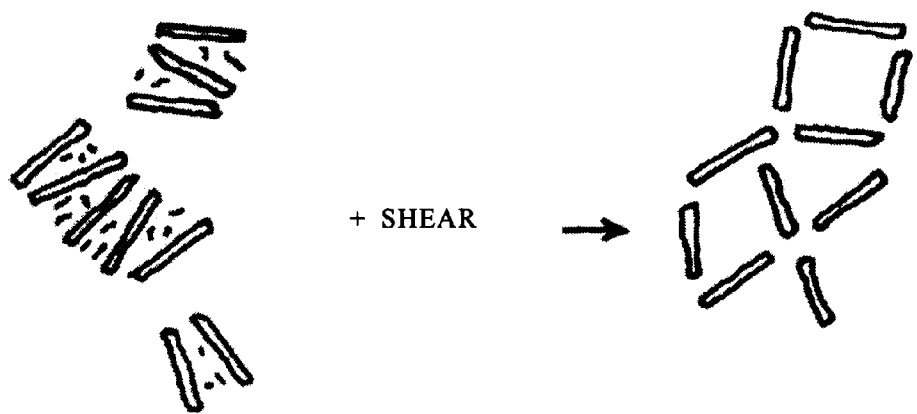
FIG. 3 is a graphic illustration of the use of an activated clay which is subjected to shearing forces and employed as an inorganic rheology modifier in the present invention.

FIG. 3 illustrates an exemplary mechanism by which the modified clays provide a thickening and/or thixotropic effect in naphthenic oil-based formulations of the present invention. As shown in FIG. 3, the chemically modified clay is provided as dry particles or in a dispersion which is subject to shearing forces that separates individual platelets which, because they contain ionic charges on their outer surfaces, are suspended much like a "house of cards" within an aqueous slurry. This rheology-modifying structure can be appreciated during stirring and/or intermixing of the components A and B of the present invention.

Preferred inorganic rheology modifiers for use in the present invention are modified clays, such as smectite clay, whose activity can be modified (or "activated") using one or more clay activity-modifying agents, including: inorganic cations (multivalent such as calcium, magnesium, aluminum, iron, or mixture) (or monovalent such as K, NH4, Cs, Rb, Fr, or mixture); organic cations (e.g., quaternary amine, phosphonium, pyridinium, sulfonium, polyquaternary ammonium, amine oxide, or organic compound containing a single cationic amine salt group); polar organic molecules capable of being absorbed by clay (e.g., oxyalkylenes, crown ether, polyvinyl alcohol, polyacrylic acid, polymethacrylic acid, polyacrylate, polycarbonate (e.g., propylene carbonate), polymethacrylate, gluconate, heptagluconate, heptagluconic acid, gluconic acid, corn syrup, or a mixture thereof); clay dispersants (e.g., polyphosphate, hexametaphosphate, tripolyphosphate, pyrophosphate, or mixture thereof); or a mixture of any of the foregoing clay modifying agents.

Exemplary formulations of the composition may contain the following key ingredients in the following ranges (percentages based upon % wt of total composition) as follows:

TABLE 3

| Key Ingredient | Preferred Range | More Preferred | Most Preferred |
| --- | --- | --- | --- |
| Component A | | | |
| Rubber | 60–70 | 62–68 | 63–67 |
| Water | 30–40 | 32–38 | 33–37 |
| Component B | | | |
| Naphthenic oil | 45–65 | 50–60 | 52–58 |
| Vulcanizing Package | 1.0–10.0 | 2.0–8.0 | 2.5–5.0 |

TABLE 3-continued

| Key Ingredient | Preferred Range | More Preferred | Most Preferred |
| --- | --- | --- | --- |
| Modified Clay | 0.2–1.5 | 0.3–1.2 | 0.4–1.0 |
| Modified Castor Oil | 0.4–3.5 | 0.6–3.0 | 0.8–2.5 |
| Pigments (TiO2) | 0.2–3.0 | 0.3–2.5 | 0.4–2.0 |
| Lime (calcium oxide) | 20–50 | 25–45 | 30–40 |
| Filler (sand/Ca Carbonate) | 1–10 | 2–8 | 4–6 |

The preferred ranges are given in terms of weight percentage based on total weight of the particular component (A or B) in which the identified ingredient is mixed. The preferred percent range of any given ingredient will depend upon a variety of factors, such as the particular rubber employed and the relative amount of the other identified components used. Care should be given to ensure Compositions of the invention may be applied as coatings to a variety of surfaces using any application technique known, including, without limitation, by trowel, spraying, pouring, and roller coating.

The following examples are provided by way of illustration only and are not intended limit the scope of the invention.

EXAMPLE 1

A formulation system was prepared in which components A and B had the following ingredients based on total dry weight solids of the total mix (total solids when A and B are combined). Component A: aqueous latex of styrene butadiene (20–25%). Component B: naphthenic oil carrier (35–55%), modified clay (0.2–1.0%), modified castor oil (0.2 to 2.5%), sand (4–6%), CaO (20–30%), sulfur (0.25–1.5%), zinc oxide (0.5–2.5%), zinc isopropyl xanthate (0.25–1.0%), and zinc dibutyl dithiocarbamate dibutylamine complex (0.25–1.0%).

Component A is a milky (white) colored latex, and is poured into component B, which might assume any color depending on pigments, if any, used. The components should be delicately and slowly mixed. Caution should be taken to avoid over-mixing or vigorous mixing, because the hardening process could proceed too quickly. Where the composition is to be applied as a coating to a surface, a hand trowel or a spray gun is used to apply the formulation mixture, which should have a thixotropic property sufficient for application to a horizontal, vertical, or curve wall surface, for example. A coating thickness of approximately 1–3 mm was achieved.

EXAMPLE 2

This example is intended to show the difference in temperature dependency of viscosity between the coating systems in this invention and the prior art.

Figure 4:
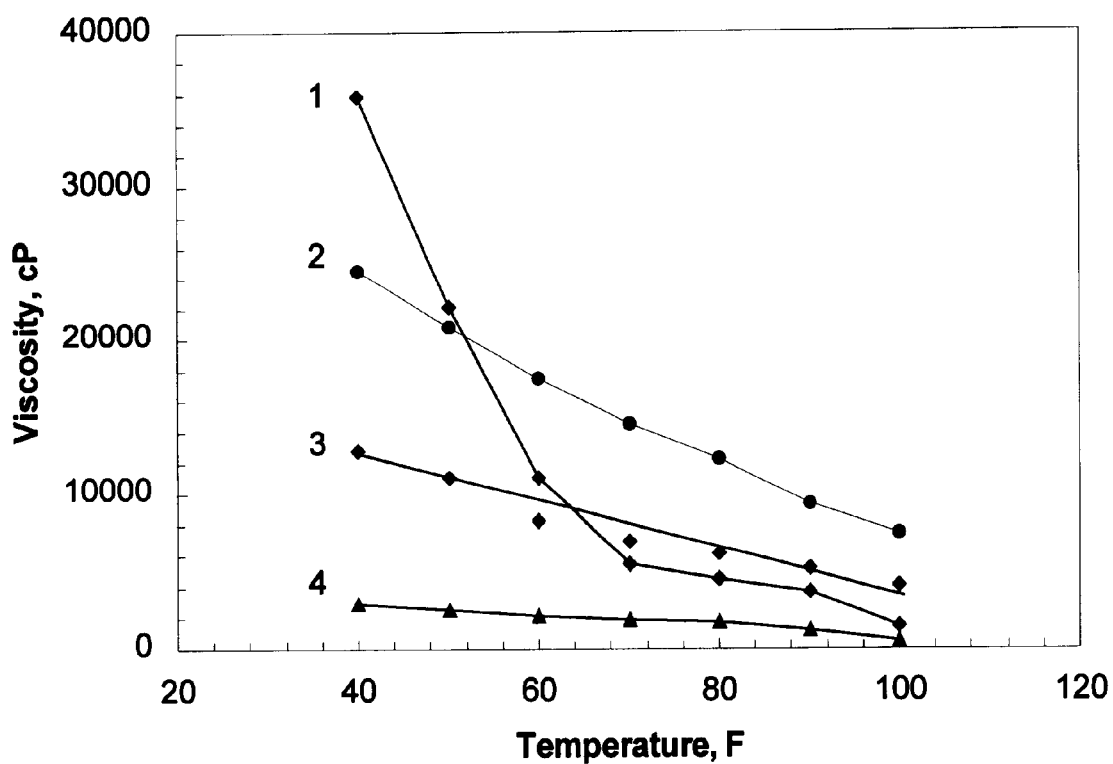
FIG. 4 is a graphic illustration of the viscosity behavior of four formulations as a function of temperature, one formulation designated "1" being a prior art formulation of FIG. 1, and three formulations designated "2" through "4" employing a naphthenic oil in accordance with the teachings of the present invention.

FIG. 4 shows the plots of viscosity as a function of temperature for three different coating materials. Plot "curves" 1 and 4 represent the materials prepared with the same formulation except that Plot 1 represents the material (component B referred to in U.S. Pat. No. 5,763,014) with a blend of aromatic and paraffinic oil as the oil carrier, while Plot 4 represents the material (component B described in this invention) with naphthenic oil as the oil carrier in component B. Plots 2 and 3 also represent the behavior of materials containing naphthenic oil but with slightly different formulations. Clearly, the dependence of viscosity on temperature for materials containing naphthenic oil was much less than the materials containing the blend of aromatic and paraffinic oil. This is shown by FIG. 4, wherein the graph lines plotted for formulations "2" through "4" demonstrate greater linearity than prior art formulation "1" over a greater temperature range. The formulations of "1" through "4", are provided in the table below:

TABLE 4

| | Formulation, % by weight | | | |
|---|---|---|---|---|
| Ingredient | 1 | 2 | 3 | 4 |
| Aromatic oil | 36 | — | — | — |
| Paraffinic oil | 24 | — | — | — |
| Naphthenic oil | — | 60.7 | 60.4 | 60 |
| Pigments | 2.2 | 0.5 | 0.5 | 2.2 |
| Vulcanization package | 3.3 | 3.4 | 3.4 | 3.3 |
| Calcium oxide | 33 | 33 | 33 | 33 |
| Stearated coated calcium carbonate | 1.1 | — | — | 1.1 |
| Mod. Clay/Activator | 0.5 | 1.0 | 0.7 | 0.5 |
| Mod. Castor oil | 0.9 | 1.3 | 2.0 | 0.9 |

(The aromatic oil was "Subdex 8600T" from Sun Company, Inc. The Paraffinic Oil was Sunpar L @ 104 from Sun Company, Inc. The Naphthenic oil was Shellflex 6212 from Shell Oil Company. Modofied clay was Claytone 40 and activator was propylene carbonate. Modified castor Oil was Troythix A from Troy Chemical Corp.)

EXAMPLE 3

Three coatings with different balance of modifiers in Component B were prepared and listed in Table 4. Component A was a 66 wt % styrene butadiene latex that was poured into component B and mixed slowly. For formulation X, part of the component A remained phase-separated even after thorough mixing, resulting in rubber particles embedded in an oil-rubber mixture after vulcanization. Formulation Y, using lots of modified clay, promoted initial mixing but lost workability after a few minutes because hardening proceeded too quickly. Formulation Z offered a balance of initial desirable mixing qualities and later workability qualities.

TABLE 5

| | Formulation, % by weight | | |
|---|---|---|---|
| Ingredient | X | Y | Z |
| Naphthenic oil | 55.0 | 54.7 | 55.5 |
| Pigments | 0.7 | 0.5 | 0.5 |
| Vulcanization package | 3.3 | 3.3 | 3.3 |
| Calcium oxide | 33.0 | 33.0 | 33 |
| Sand | 5.0 | 5.0 | 5.0 |
| Mod. Clay + activator | 0.0 | 2.5 | 0.7 |
| Mod. Castor oil (Troythix A) | 3.0 | 1.0 | 2.0 |

(The naphthenic oil was Shellflex 6212 from Shell Oil. The modified clay was Claytone 40, and the clay activator was propylene carbonate.)

The scope of the invention is not intended to be limited by the foregoing exemplary embodiments which are provided for illustrative purposes.

We claim:

1. An elastomeric formulation system, comprising: components A and B which are combinable to form a blend in which a vulcanizing reaction is initiated for solidifying the components into a solid mass; component A thereof comprising an aqueous latex of natural or synthetic rubber; and component B thereof comprising an oil carrier in which is dispersed a vulcanizing agent operative to cure the component A rubber, and component B further comprising a hygroscopic agent operative to chemically bind the water in component A; said component A and B being operative when intermixed to form a water-in-oil blend whereby said oil carrier containing said hygroscopic agent and vulcanizing agent provides a continuous phase wherein an aqueous phase of component A containing said rubber is dispersed therein as a discontinuous phase, the respective locations of said hygroscopic agent, vulcanizing agent, and rubber thereby providing a reaction dynamic wherein said rubber becomes swelled by said oil and said hygroscopic agent chemically binds water in the latex discontinuous aqueous phase, thereby effectuating an increase in viscosity of said intermixed components and enabling said vulcanizing agent and rubber to be introduced to each other such that curing can be achieved at a time later than said viscosity-increasing effectuation;

said oil carrier of component B comprising: (a) a naphthenic oil in the amount of 40–90% by total weight of said oil carrier, said naphthenic oil comprising aromatics, paraffins, and naphthenes, wherein said naphthenes are saturated cyclic hydrocarbons and are percentage-wise the major component of said naphthenic oil; and (b) an organic rheology modifier in the amount of 0.4 to 3.5 wt % based on total weight of said oil carrier, said organic rheology modifier comprising a modified castor oil, a polyamide, a linear or branched alkylene molecule having a molecular weight of 1000–100,000, calcium sulfonate, modified urea, or a mixture thereof.

2. The formulation system of claim 1 wherein said components A and B are separated from each other.

3. The formulation system of claim 1 wherein said components A and B are intermixed and allowed to harden into a solidified mass.

4. The formulation system of claim 1 wherein said organic rheology modifier comprises a modified castor oil.

5. The formulation system of claim 1 wherein said modified castor oil is hydrogenated castor oil.

6. The formulation system of claim 1 wherein said modified castor oil is castor oil derivatized by hydrogenation, epoxidation, esterification, sulfonation, polymerization, or a combination thereof.

7. The formulation system of claim 6 further comprising a polyamide.

8. The formulation system of claim 6 wherein said modified castor oil comprises a glyceride of 12-hydroxystearic acid.

9. The formulation system of claim 1 wherein said component B further comprises an inorganic rheology modifying agent.

10. The formulation system of claim 9 wherein said inorganic rheology modifying agent comprises a modified clay.

11. The formulation system of claim 10 wherein said modified clay comprises the reaction product of a smectite clay and a clay activity modifying agent comprising an inorganic cation, an organic cation, a polar organic agent capable of being absorbed by clay, a clay dispersant, or mixture thereof.

12. The formulation system of claim 11 wherein said modified clay comprises clay modified with a quaternary amine.

13. The formulation system of claim 1 wherein said napthenic oil comprises, based on weight of component B oil carrier, 15–26 wt % paraffinic oil, 8–13 wt % aromatic oil, and 61–76 wt % naphthenic oil.

14. The formulation system of claim 13 wherein said oil carrier further comprises a modified castor oil in the amount of 0.2 to 3.5 wt %, based on the total weight of the component B oil carrier.

15. The formulation system of claim 1 wherein, upon intermixing, said components A and B provide a water-in-oil composition having a substantially linear slope between 50 degrees F and 90 degrees F.

16. The formulation system of claim 1 comprising a modified castor oil, a polyamide, and a modified clay.

17. A hardened elastomeric composition formed by intermixing components A and B of claim 14.

18. The hardened elastomeric composition of claim 17 being applied as a coating on a substrate.

19. The formulation system of claim 1 wherein said organic rheology modifier comprises a modified castor oil; and said formulation system further comprises an inorganic rheology modifier.

20. The formulation system of claim 19 wherein said inorganic rheology modifier comprises a modified clay.

21. A method for making an elastomeric composition, comprising providing components A and B which are combinable to form a blend in which a vulcanizing reaction is initiated for solidifying the components into a solid mass; component A thereof comprising an aqueous latex of natural or synthetic rubber; and component B thereof comprising an oil carrier in which is dispersed a vulcanizing agent operative to cure the component A rubber, and component B further comprising a hygroscopic agent operative to chemically bind the water in component A; said component A and B being operative when intermixed to form a water-in-oil blend whereby said oil carrier containing said hygroscopic agent and vulcanizing agent provides a continuous phase wherein an aqueous phase of component A containing said rubber is dispersed therein as a discontinuous phase, the respective locations of said hygroscopic agent, vulcanizing agent, and rubber thereby providing a reaction dynamic wherein said rubber becomes swelled by said oil and said hygroscopic agent chemically binds water in the latex discontinuous aqueous phase, thereby effectuating an increase in viscosity of said intermixed components and enabling said vulcanizing agent and rubber to be introduced to each other such that curing can be achieved at a time later than said viscosity-increasing effectuation;

said oil carrier of component B comprising: (a) a napthenic oil in the amount of 40–90% by total weight of said oil carrier, said naphthenic oil comprising aromatics, paraffins, and naphthenes, wherein said naphthenes are saturated cyclic hydrocarbons and are percentage-wise the major component of said naphthenic oil; and (b) an organic rheology modifier in the amount of 0.4 to 3.5 wt % based on total weight of said oil carrier, said organic rheology modifier comprising a modified castor oil, a polyamide, a linear or branched alkylene molecule having a molecular weight of 1000–100,000, calcium sulfonate, modified urea, or a mixture thereof.

\* \* \* \* \*